(12) United States Patent
Li et al.

(10) Patent No.: US 12,530,872 B2
(45) Date of Patent: Jan. 20, 2026

(54) IMAGE RESTORATION USING MACHINE LEARNING

(71) Applicant: HUAWEI TECHNOLOGIES CO., LTD., Guangdong (CN)

(72) Inventors: Zeju Li, Shenzhen (CN); Liang Chen, Shenzhen (CN); Gregory Slabaugh, London (GB); Liu Liu, Beijing (CN); Zhongqian Fu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 479 days.

(21) Appl. No.: 17/955,846

(22) Filed: Sep. 29, 2022

(65) Prior Publication Data

US 2023/0033458 A1   Feb. 2, 2023

Related U.S. Application Data

(63) Continuation of application No. PCT/EP2020/059078, filed on Mar. 31, 2020.

(51) Int. Cl.
| | |
|---|---|
| G06V 10/774 | (2022.01) |
| G06T 3/4015 | (2024.01) |
| G06T 5/60 | (2024.01) |
| G06T 5/70 | (2024.01) |
| G06V 10/22 | (2022.01) |
| G06V 10/776 | (2022.01) |
| G06V 10/82 | (2022.01) |

(52) U.S. Cl.
CPC .......... *G06V 10/774* (2022.01); *G06T 3/4015* (2013.01); *G06T 5/60* (2024.01); *G06T 5/70* (2024.01); *G06V 10/22* (2022.01); *G06V 10/776* (2022.01); *G06V 10/82* (2022.01); *G06T 2207/20076* (2013.01); *G06T 2207/20084* (2013.01)

(58) Field of Classification Search
CPC . G06T 2207/20081; G06T 2207/20076; G06T 2207/20084; G06T 3/4015; G06T 5/60; G06T 5/70; G06T 5/00; G06V 10/22; G06V 10/774; G06V 10/776; G06V 10/82
USPC .......................................................... 382/156
See application file for complete search history.

(56) References Cited

U.S. PATENT DOCUMENTS

| | | | |
|---|---|---|---|
| 11,386,293 B2 * | 7/2022 | Sutic ...................... | G06N 3/045 |
| 2019/0244139 A1 | 8/2019 | Varadarajan et al. | |
| 2019/0295223 A1 * | 9/2019 | Shen ...................... | G06N 3/045 |

OTHER PUBLICATIONS

Liu, Ding, et al. "When image denoising meets high-level vision tasks: A deep learning approach." arXiv preprint arXiv:1706.04284 (2017). (Year: 2017).*

(Continued)

*Primary Examiner* — Chineyere Wills-Burns
*Assistant Examiner* — Emmanuel Silva-Avina

(57) ABSTRACT

A device comprising an image processor configured to implement: a first machine learning model for performing restoration processing on degraded image data; and a second machine learning model for recognizing areas of an image requiring processing emphasis during the restoration processing, wherein the output of the second machine learning model is an input to the first machine learning model to optimize the restoration processing.

20 Claims, 5 Drawing Sheets

(56) References Cited

OTHER PUBLICATIONS

Xiao, Lei, et al. "Discriminative transfer learning for general image restoration." IEEE Transactions on Image Processing 27.8 (2018) : 4091-4104. (Year: 2018).*
Somasundaran, Biju Venkadath, Rajiv Soundararajan, and Soma Biswas. "Image denoising for image retrieval by cascading a deep quality assessment network." 2018 25th IEEE international conference on image processing (ICIP). IEEE, 2018. (Year: 2018).*
Kokkinos, Filippos, and Stamatios Lefkimmiatis. "Iterative joint image demosaicking and denoising using a residual denoising network." IEEE Transactions on Image Processing 28.8 (2019): 4177-4188. (Year: 2019).*
Liu, Ding, et al. "Connecting image denoising and high-level vision tasks via deep learning." IEEE Transactions on Image Processing 29 (2020): 3695-3706. (Year: 2020).*
Niu, Xuejing, et al. "Effective image restoration for semantic segmentation." Neurocomputing 374 (2020): 100-108. (Year: 2020).*
Wang, Zhihao, Jian Chen, and Steven CH Hoi. "Deep Learning for Image Super-resolution: A Survey." arXiv preprint arXiv:1902.06068 (2019). (Year: 2019).*
Niu Xuejing et al: "Effective image restoration for semantic segmentation", Neurocomputing, Elsevier, Amsterdam, NL, vol. 374, Sep. 25, 2019 (Sep. 25, 2019), pp. 100-108, XP085910403.
Kai Zhang et al, Beyond a Gaussian Denoiser: Residual Learning of Deep CNN for Image Denoising, IEEE Transactions on Image Processing, vol. 26, No. 7, Jul. 2017, 14 pages.
Chan Chung et al: "Feature Oriented Deep Convolutional Neural Network for PET Image De noising", 2018 IEEE Nuclear Science Symposium and Medical Imaging Conference Proceedings (NSS/MIC), IEEE, Nov. 10, 2018 (Nov. 10, 2018), pp. 1-4, XP033613016.
Michael Gharbi et al, Deep Joint Demosaicking and Denoising, SA 16 Technical Papers,, Dec. 5-8, 2016, Macao, 12 pages.
Ren Haoyu et al: "DN-ResNet: Efficient Deep Residual Network for Image Denoising", May 26, 2019 (May 26, 2019), Advances in Databases and Information Systems; [Lecture Notes in Computer Science; Lect. Notes Computer], Springer International Publishing, Cham, pp. 215-230, XP047508261.
Seungjun Nah et al, Deep Multi-scale Convolutional Neural Network for Dynamic Scene Deblurring, arXiv:1612.02177v2 [cs.CV] May 7, 2018, 21 pages.
Michael Gharbi et al: "Deep joint demosaicking and denoising", ACM Transactions on Graphics, ACM, NY, US, vol. 35, No. 6, Nov. 11, 2016 (Nov, 11, 2016), pp. 1-12, XP058306363.
Dehua Song et al, Efficient Residual Dense Block Search for Image Super-Resolution, arXiv:1909.11409v3 [cs.CV] Dec. 30, 2019, 9 pages.
Bee Lim et al, Enhanced Deep Residual Networks for Single Image Super-Resolution, arXiv:1707.02921v1 [cs.CV] Jul. 10, 2017, 9 pages.
Yoshua Bengio, Gradient-Based Optimization of Hyper-Parameters, Neural Computation Manuscript# 2045, Sep. 30, 1999, 18 pages.
Haokui Zhang et al, IR-NAS: Neural Architecture Search for Image Restoration, 1 arXiv:1909.08228v1 [cs.CV] Sep. 18, 2019, 9 pages.
Zhiting Hu et al, Learning Data Manipulation for Augmentation and Weighting, arXiv:1910.12795v1 [cs.LG] Oct. 28, 2019, 12 pages.
Kai Zhang et al, Learning Deep CNN Denoiser Prior for Image Restoration, 2017 IEEE Conference on Computer Vision and Pattern Recognition, 10 pages.
Mengye Ren et al, Learning to Reweight Examples for Robust Deep Learning, arXiv:1803.09050v3 [cs.LG] May 5, 2019, 13 pages.
Abhinav Shrivastava et al, Training Region-based Object Detectors with Online Hard Example Mining, 2016 IEEE Conference on Computer Vision and Pattern Recognition, 9 pages.
International Search Report and Written Opinion issued in PCT/EP2020/059078, dated Oct. 22, 2020, 12 pages.

* cited by examiner

IMAGE RESTORATION USING MACHINE LEARNING

CROSS-REFERENCE TO RELATED APPLICATIONS

This application is a continuation of International Application No. PCT/EP2020/059078, filed on Mar. 31, 2020, the disclosure of which is hereby incorporated by reference in its entirety.

FIELD OF THE INVENTION

This invention relates to devices and methods for implementing and training machine learning models for image processing.

BACKGROUND

Image processing can be used to alter images for a multitude of purposes. One such purpose is the restoration of degraded images. Image restoration processing seeks to improve the quality of a degraded image. There are many common forms of image degradation, including noise, blur, limited contrast, or low resolution. Similarly, there are many types of image restoration processing designed to try to mitigate these forms of degradation.

FIG. 1 shows an example of an image restoration process. A low resolution image 102 of a tiger appears on the top left. The low resolution image 102 is passed forward to an image restoration process. The image restoration process is implemented according to a machine learning model, denoted in the figure as $f_\theta$, and increases the image resolution. The image restoration thus produces a higher resolution image 106 shown on the top right. The higher resolution image 106 is therefore of a higher quality than the input image 102.

Many modern approaches to image restoration are based on machine learning, where $f_\theta$ is a deep neural network comprising an architecture and a set of parameters $\theta$, also known as weights. The parameters are found during a training process, also known as learning, that performs mathematical optimization of an error computed using training data. In the case of image restoration, the training data typically comprises a collection of image pairs, each pair consisting of a degraded image and a ground truth restored image or optimized image. Each degraded image is passed into the network, which restores the image in a forward pass. FIG. 1 shows the forward pass 108 as a series of arrows running from left to right, starting at the low resolution image 102 to the restoration process 104, and continuing to the high resolution image 106. The restored image 106 is compared to the ground truth image, and differences between the two are encoded into an error, also known as a loss. The loss is then back-propagated through the network in a backward pass that updates the parameters. The backward pass is shown in FIG. 1 as a dashed arrow 110 from right to left. This process of a forward pass followed by a backward pass is repeated many times over the collection of images until convergence. A training method that updates all the parameters in the neural network from input to output is known as end-to-end. The trained deep network including the architecture and learned parameters is also known as a model or machine learning model. The model can be used to restore new, unseen degraded images during what is called inference. Inference is used when talking about machine learning models in a similar way to the term execution for computer programs. Often sample patches or crops of an image are used for training for reasons of computational efficiency and reduced complexity.

Also included in FIG. 1 is a standard image restoration learning pipeline. The illustrated pipeline includes building a database 112 of training data, sampling 114 the training data from the database, building a network model 116 by a method of training using the sampled training data, and its subsequent optimization 118.

Existing methods for training sample training data uniformly from the database. There exist industry standards for sampling data depending on the tasks the neural network is being trained for. Often a set size of sample region from an image will be used which covers a defined pixel by pixel dimensioned area of the training image. This uniform sampling does not consider the data distribution and intrinsic features of the training images. It is known that some images, and even some pixels, are often more useful for training the network and result in improved performance for image restoration.

Existing image restoration approaches use an end-to-end scheme as in FIG. 1, which produces the high quality images from the low quality images. Typically every pixel is sampled with the same probability and contributes equally to the loss, such as image denoising [Zhang, Kai, et al. "Beyond a gaussian denoiser: Residual learning of deep cnn for image denoising." IEEE Transactions on Image Processing 26.7 (2017): 3142-3155], image deblur [Nah, Seungjun, Tae Hyun Kim, and Kyoung Mu Lee. "Deep multi-scale convolutional neural network for dynamic scene deblurring." Proceedings of the IEEE Conference on Computer Vision and Pattern Recognition. 2017], super-resolution [Lim, Bee, et al. "Enhanced deep residual networks for single image super-resolution." Proceedings of the IEEE Conference on Computer Vision and Pattern Recognition Workshops. 2017] and other image restoration tasks [Zhang, Kai, et al. "Learning deep CNN denoiser prior for image restoration." Proceedings of the IEEE Conference on Computer Vision and Pattern Recognition. 2017].

However, different parts of real images have different characteristics, e.g. high frequency and low frequency patterns. These characteristic differences can be crucial for some tasks in which the degradation is local, e.g., local motion blur. Training the machine learning model on images with different characteristics to an equal extent cannot achieve the highest performance. In order to tune the network towards challenging samples, some studies have reweighted the training data and demonstrated that a deep model can obtain better performance by mining hard samples [Shrivastava, Abhinav, Abhinav Gupta, and Ross Girshick. "Training region-based object detectors with online hard example mining." Proceedings of the IEEE Conference on Computer Vision and Pattern Recognition. 2016]. Specifically, after training a deep neural network for demosaicing, Gharbi et al. manually selected hard samples to fine-tune the network [Gharbi, Michaël, et al. "Deep joint demosaicking and denoising." ACM Transactions on Graphics (TOG) 35.6 (2016): 1-12]. However, their data weighting method was done with a laborious two-stage process. In addition, there is no guarantee that the selected hard samples will improve the neural network with regard to its general application for that image processing task.

It is therefore desirable to develop a sampling process for training a machine learning model for restoration processing tasks which takes into account the non-uniformity of an image.

SUMMARY OF THE INVENTION

According to a first aspect, there is provided a device comprising an image processor, the image processor being configured to implement: a first machine learning model for performing restoration processing on degraded image data; and a second machine learning model for recognizing areas of an image requiring processing emphasis during the restoration processing, wherein the output of the second machine learning model is an input to the first machine learning model to optimize the restoration processing.

The first machine learning model may be trained according to the steps of: receiving training data comprising the degraded image data and corresponding optimum image data and providing the degraded image data as an initial input to the system; passing the degraded image data to the first machine learning model configured to create reconstructed image data by performing the restoration processing of the degraded image data; determining loss data by comparing the reconstructed image data to the corresponding optimum image data; combining the loss data with a weight map to form weighted loss data; and updating the first machine learning model based on the weighted loss data. This may allow the restoration processing to account for specific areas within the image which require more attention.

The second machine learning model may be trained according to the steps of: receiving the weighted loss data at the second machine learning model; determining by the second machine learning model a spatial distribution of the loss based on the weighted loss data; and updating the weight map to account for the spatial distribution of the loss derived from the weighted loss data. This may allow for the weight map to be optimized based on the weighted loss data output during training of the first machine learning model.

The second machine learning model may be trained to: identify which spatially distributed regions of a degraded image are more susceptible to degradation based on one or more image features; and generate a weight map for use in performing restoration processing on the degraded image such that a greater weighting is applied to the identified regions. This may allow the second machine learning model to infer an appropriate weight map directly from the image.

According to a second aspect, there is provided a method of training an image processing system, the image processing system comprising a first machine learning model, and the method comprising training the first machine learning model by executing the steps of: receiving training data comprising degraded image data and corresponding optimum image data and providing the degraded image data as an input to the system; passing the degraded image data to a first machine learning model configured to create restored image data by restoring the degraded image data; determining loss data by comparing the restored image data to the corresponding optimum image data; combining the loss data with a weight map to form weighted loss data comprising the spatial distribution of the loss data; and updating the first machine learning model based on the weighted loss data.

The image processing system may comprise a second machine learning model and the method may comprise training the second machine learning model by implementing an updating process executing the steps of: receiving the weighted loss data at a second machine learning model; determining by the second machine learning model a spatial distribution of the loss data based on the weighted loss data; and updating the weight map to account for the spatial distribution of the loss derived from the weighted loss data. This may allow for the weight map to be optimized based on the weighted loss data output during the training of the first machine learning model. This can improve the future inference of weight maps from image data by the second machine learning model.

The updating process may be repeated so as to iteratively update the weight map based on weighted loss data generated from a previous weight map and the first machine learning model. This allows for the second machine learning model to be trained to infer a more detailed and optimized weight map.

In at least some iterations of the method the training data may be different from the training data received in the previous iteration of the method. The training data may be changed between iterations such that the machine learning models are trained to implement restoration processing on a diverse set of image data.

The method may comprise modifying the first machine learning model by combining the first machine learning model, with the second machine learning model, to create a modified first machine learning model, such that the modified first machine learning model is trained to focus on regions of a degraded image that are more susceptible to degradation. This may enable the creation of a machine learning model which combines the learned ability to focus restoration processing on areas within an image and the learned ability to implement restoration processing on the same image.

The method may comprise: receiving test data comprising degraded image data and corresponding optimum image data and providing the degraded image data as an input to the modified first machine learning model; creating reconstructed image data by restoration processing of the degraded image data; determining loss data by comparing the reconstructed image data to the corresponding optimum image data; and optimizing the second machine learning model based on the loss data. This may provide an efficient restoration processing by further optimizing the second machine learning model's ability to infer a weight map from degraded image data.

The method may comprise training the updated first machine learning model as above, wherein the weight map is generated by the optimized second machine learning model being previously trained according to the above method. This may provide an efficient restoration processing by further training the first machine learning model to implement restoration processing using a weight map inferred by an already optimized second machine learning model.

The method may comprise updating the optimized second machine learning model by implementing an updating process executing the steps of: receiving weighted loss data at the optimized second machine learning model; determining by the optimized second machine learning model a spatial distribution of the loss data based on the weighted loss data; and updating the optimized second machine learning model to generate a weight map to account for the spatial distribution of the loss derived from the weighted loss data. This may provide efficient restoration processing by further training of the second machine learning model based on the output of an already updated first machine learning model and an already optimized second machine learning model.

The method may comprise modifying the modified first machine learning model by combining the updated first machine learning model with the updated optimized second machine learning model to create a second modified first machine learning model such that the second modified first machine learning model is trained to focus on regions of a degraded image that are more susceptible to degradation.

This may provide a further optimized first machine learning model to implement restoration processing.

The restoration processing may be a joint denoising and demosaicing processing and the received degraded image data is RAW image data comprising a red, green or blue value for each sampled pixel, such that the first machine learning model is trained to infer a denoised and demosaiced RGB image from the received RAW image data. This may allow for an efficient denoising and demosaicing processing.

According to a third aspect, there is provided a device configured to train an image processing system according to the above discussed method of training the image processing system.

BRIEF DESCRIPTION OF THE FIGURES

The present invention will now be described by way of example with reference to the accompanying drawings. In the drawings.

DETAILED DESCRIPTION OF THE INVENTION

The proposed approach aims to emphasize the important characteristics of the training data and as a result improve the model's performance.

There is proposed a solution to improve image restoration processing performance through better data sampling of training data. Specifically, by using an end-to-end learning method that considers each training image pixel with a different weight. The different weights are implemented as a weight map. The weight map of each training image is learned by a gradient-based meta-task, herein also referred to as a second machine learning model $g_\omega$.

The proposed approach comprises an image processing machine learning model (or first machine learning model), learning different weights for different image samples in training based on a parallel meta-learning step using the second machine learning model. The weights are encoded on a per-pixel basis and may therefore be used to form a weight map. The first machine learning model may then be further optimized based on the performance of the machine learning model on another independent dataset.

The proposed approach comprises training the machine learning model based on the required weights for different pixels of the training images. Existing image restoration methods calculate the loss function of an image sample pair for the network $f_\theta$ according to the equation:

$$\mathcal{L}_{train}(f_\theta(T_L), T_H) = \frac{1}{HW} \sum\nolimits_{H,W} \mathcal{L}(f_\theta(T_L(h, w)), T_H(h, w)). \quad (1)$$

Here, $\mathcal{L}_{train}$ is the loss on the training set $\{T_L, T_H\}$. $\mathcal{L}$ is the pixel wise loss criterion, and it is usually L1 or L2 norm. H and W are the height and width of the image sample. $T_L(h, w)$ and $T_H(h, w)$ are the intensities of the low quality, L, and high quality, H, images at pixel (h, w), respectively. Our method aims to gain a weight for each pixel. Therefore, the modified loss function $\mathcal{L}_{train}'$ would become:

$$\mathcal{L}_{train}'(f_\theta(T_L), T_H) = \quad (2)$$

$$\frac{1}{HW} \sum\nolimits_{H,W} (\mathcal{L}_{train}(f_\theta(T_L(h, w)), T_H(h, w)) \cdot W(h, w)).$$

Where $W(h, w)$ is the weight of the pixel.

A norm is a function that measures difference between inputs. In this case, we are measuring the difference between a ground truth image, and one that is restored by the approach.

The L1 norm is a sum of the absolute difference between each matching color of each matching pixel in the ground truth and restored images. The L2 norm is a sum of the squared difference between each matching color of each matching pixel in the ground truth and restored images. In either case, if the image is perfectly restored, it will match the ground truth at every pixel, so the L1 or the L2 norm will be zero.

The norm may be used as an error signal and may be back-propagated through the network during training to adjust the network weights.

Figure 1:
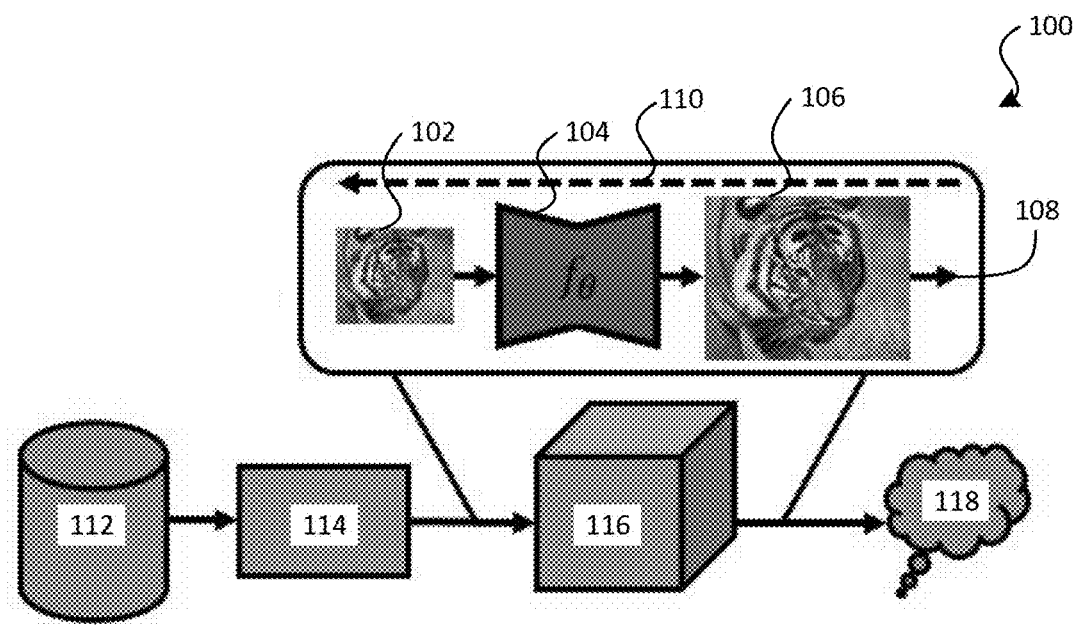
FIG. 1 shows a standard learning pipeline for image restoration tasks.
Figure 2:
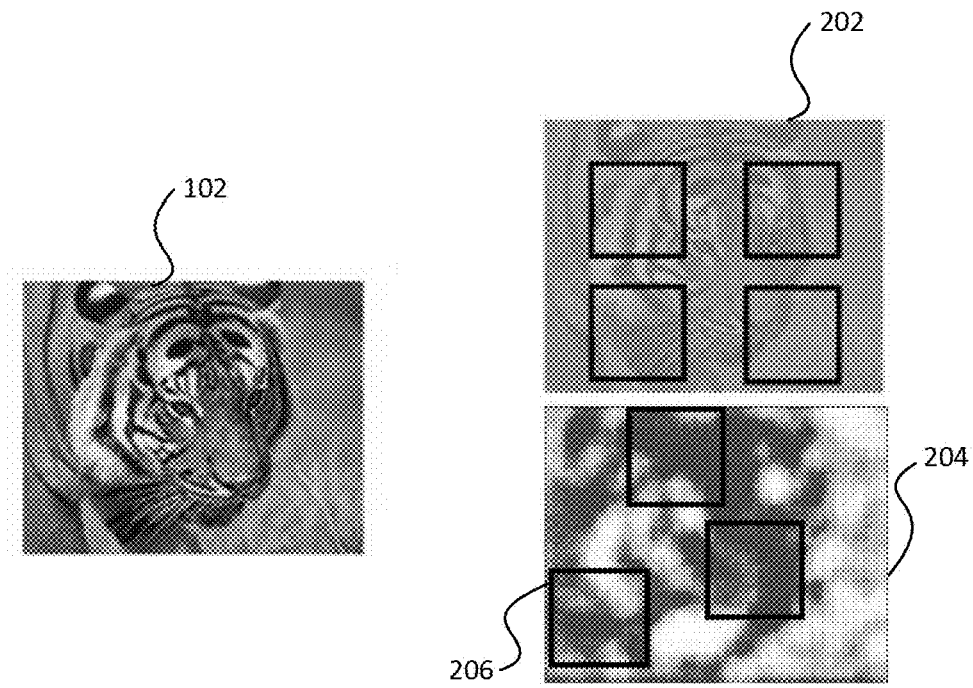
FIG. 2 illustrates the proposed approach compared to existing approaches based on the generated weight map.

FIG. 2 shows the proposed approach illustrated using weight maps. On the left is the training image 102. On the right are the two distinct weight maps based on the different approaches. In the top weight map 202, it can be seen that each pixel has the same weight. That is, the loss at each pixel has the same contribution. In the figure all the pixels have the same level of color filter applied to illustrate the uniform sampling. In the bottom weight map 204, it can be seen that each pixel has its own weight. That is, the loss at each pixel can have a different contribution. This is illustrated by a different level of color filter (show in greyscale) being applied to each individual pixel. The different pixels have a weighting which may correspond with the amount of detail or texture in the image at that pixel location. It is possible to see in weight map a representation of the tiger in the image which represents its individual relevance and importance to the loss function.

A plurality of sample squares 206 is shown on both weight maps 202 and 204. During training machine learning models for image processing tasks it is known to implement samples of training images (and possibly also test images like those described herein), for the purposes of minimizing processing cost during training. This can make the training more computationally efficient and faster end-to-end. Samples 206 may be taken from the training and test image data based on a standard sample size defined for the specific image processing task the machine learning model is being trained for.

Figure 3:
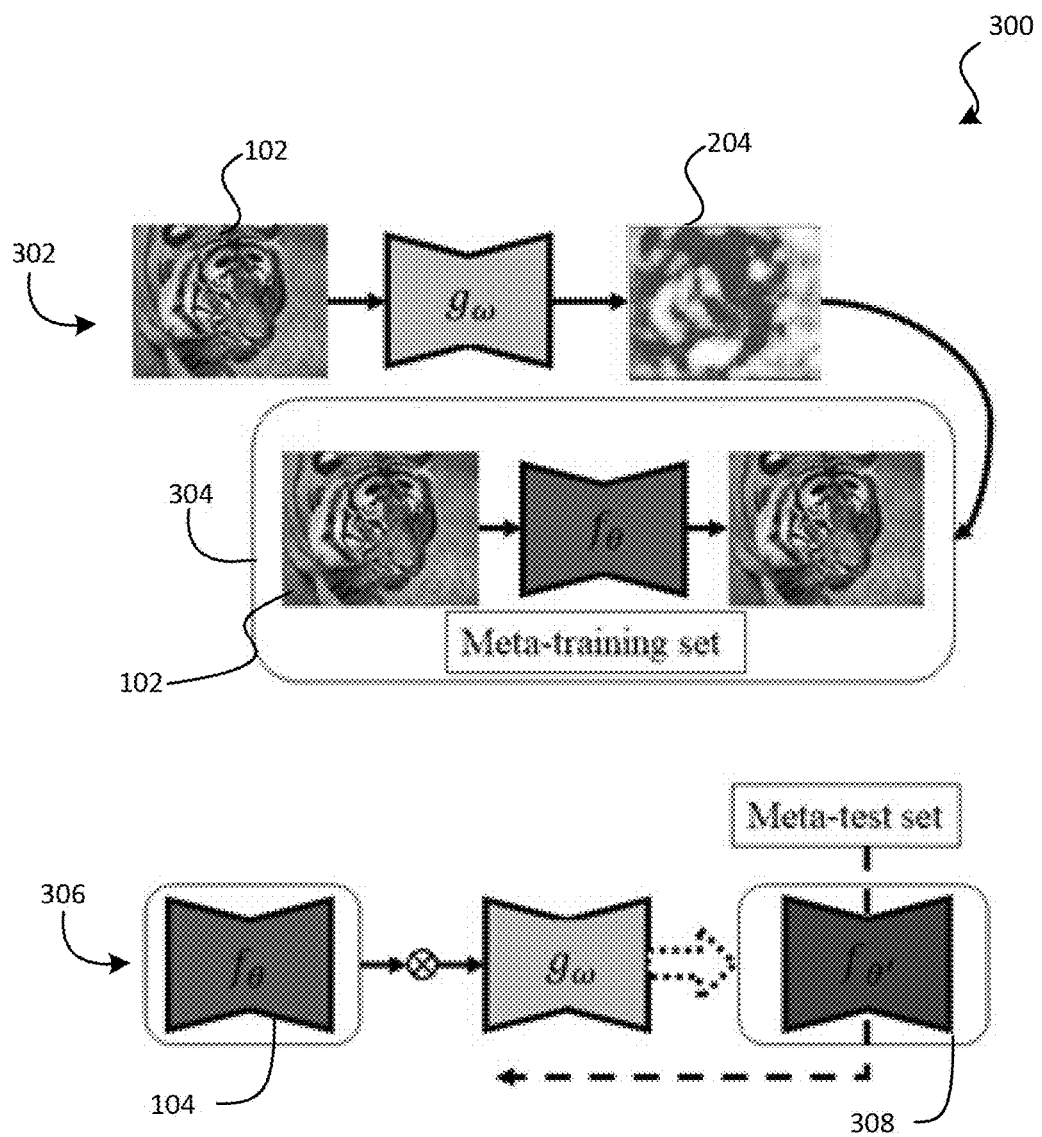
FIG. 3 shows the three main training structures of the overall framework for training the first machine learning model utilizing the generated weight map.

FIG. 3 shows the overall framework 300 for training the machine learning model utilizing the weight map 204, which contains three main training structures.

The first structure 302 is the weight generator structure. The weight generator model $g_\omega$ is a neural network which is trained to reweight the image pixels, also referred to herein as the second machine learning model. $g_\omega$ is optimized in an outer loop 302 of the training framework. The parameters ω are learned during training.

The second structure 304 is the restoration network or first machine learning model $f_\theta$. The restoration network is the neural network which reconstructs the high quality image from the corresponding low quality image. $f_\theta$ is trained on an image restoration task in the inner loop 304.

The third structure 306 is the gradient-based meta-learning scheme 306 which steers the process of the outer loop 302 and the inner loop 304. In the third structure 306 the first machine learning model 104 and the second machine learning model are combined to modify the first machine learning model 308. The second machine learning model $g_\omega$ has been updated using the training data set in order to improve the first model's performance in this next phase which comprises processing previously unseen held-out data, also called the meta-test data set. The created weight map 204 is also optimized in the meta-learning scheme of the third structure 306 by way of a backwards pass to the second machine learning model based on the loss from the modified first machine learning model 308. The training data, which has a high chance of leading to good first model performance on the test data, may be assigned with high weighting.

In FIG. 3, the three structures 302, 304, and 306, represent various loops of updating and optimization separated into different structural processes. However, during the implementation of training the first machine learning model, these are concurrently or consecutively running processes. For example, the first and second structures of the training process may be concurrently run so that as the first machine learning model is trained to perform the restoration processing on the degraded images 102, the second machine learning model is also being trained to recognize the spatial distribution of the weighted loss and use this to infer an updated weight map.

The processes may be initialized with a uniform weight map, which in one implementation of the training process may then be iteratively updated by repeating the updating process to produce an increasingly updated weight map each time until a sufficient level of convergence is reached.

The next step may then be the processing loop illustrated in the third structure 306, where the first machine learning model and the second machine learning model are combined to provide a modified first machine learning model which is additionally trained to focus on regions of a degraded image that are more susceptible to degradation. This focusing ability results from the modified model now comprising some training directly obtained from the second machine learning model. The modified first model can then be tested on test data, and the resulting loss from the modified first model may be used to further tune the second machine learning model.

In an alternative implementation, the iterative process of updating the weight map may be performed such that each iteration of the updating of the weight map is performed only after a respective iteration of the process in the third structure 306. That is, the processes of the first and second structures are performed once, and then the processes of the third structure are performed before the processes of the first and second structure are performed again.

In between iterations of either of the above implementation options the training data may or may not be changed. For example, the tiger image in the example of FIG. 3 may be used to create a weight map and to update the first model in one iteration. Then in the next iteration the tiger may be used again, and repeatedly in further iterations to further update the first model and until the weight map for the tiger image is updated to a degree of convergence. Alternatively, the next iteration may use a different image, for example an image of a lion. Either of these options will eventually result in the same outcome, a second machine learning model which is trained to identify which spatially distributed regions of a degraded image are more susceptible to degradation based on one or more image features; and to generate a weight map for use in performing restoration processing on the degraded image such that a greater weighting is applied to the identified regions.

Figure 4A:
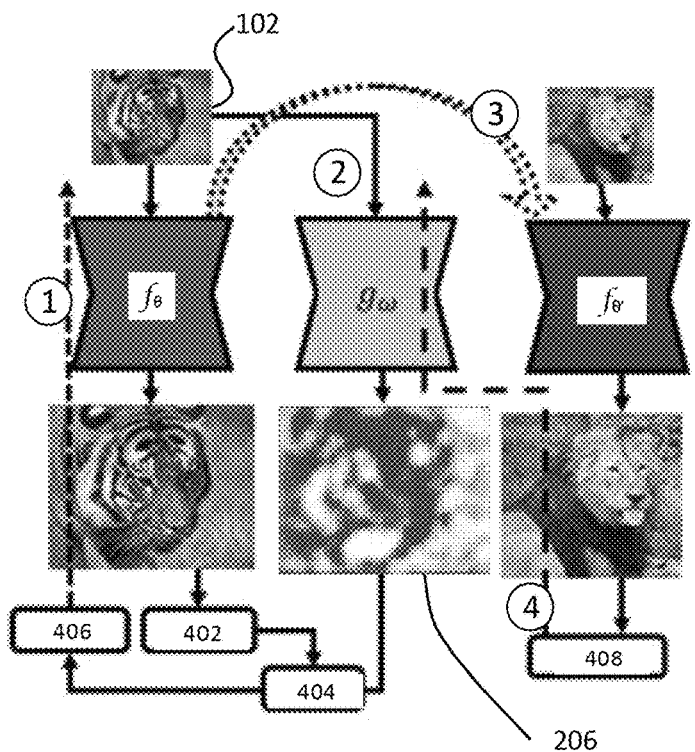
FIG. 4A shows a detailed schematic of the proposed approach.
Figure 4B:
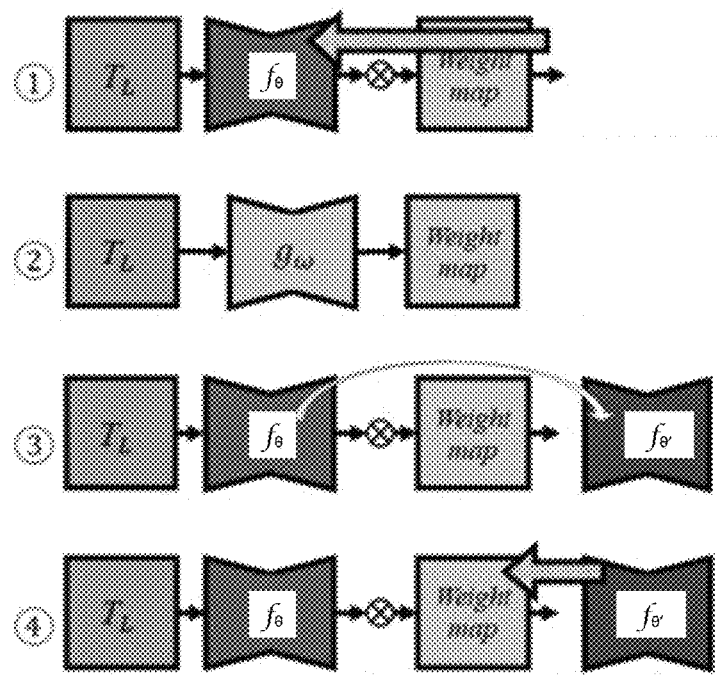
FIG. 4B shows the four main calculations as steps of one full iteration of the proposed training process.

FIG. 4A shows a detailed schematic of the proposed approach. FIG. 4B shows the four main calculations as steps of one full iteration of the proposed training process. To assist in the understanding of how these calculations relate to each other, each calculation in FIG. 4B is numbered and indicated in the schematic diagram of FIG. 4A using those same numbers. The schematic diagram 4A shows the elements of the image restoration training process such as the machine learning models, f, $g_\omega$, and $f_{\theta'}$, the training and test data sets, and the weight map 204; whereas the steps of a single iteration in 5B illustrate how particular elements interact with each other.

The first step of the proposed training process is to use a weight map 204 during the training of the first machine learning model, otherwise known as the image restoration network. The first iteration may comprise a weight map 204 which has a pre-defined distribution of weights, for example a uniform distribution of weights, or a distribution with a specific shape or pattern. However, in later iterations training may use a weight map 204 derived from the training data 102.

One iteration of the core training process is illustrated on the left of FIG. 4A and steps (1) and (2) of FIG. 4B. The two machine learning models are updated in a nested way. Firstly, in the central loop, training data $T_L$ is fed into $g_\omega$ to produce a weight map which assigns different weights to the meta-training set $\{T_L, T_H\}$. Secondly, in the left-most loop, $T_L$ is input to the restoration network $f_\theta$ and the corresponding loss 402 $\mathcal{L}_{train}(f_\theta(T_L), T_H)$ is calculated.

The weight map is applied 404 to the standard loss function given below, to train the image restoration network.

$$\mathcal{L}_{train}'(f_\theta(T_L), T_H) = \mathcal{L}_{train}(f_\theta(T_L), T_H) \cdot g_\omega(T_L). \quad (3)$$

Different from the normal training procedure, the loss $\mathcal{L}_{train}(f_\theta(T_L), T_H)$ is weighted by the weight map 204 and becomes $\mathcal{L}_{train}'(f_\theta(T_L), T_H)$, as illustrated in equation (3) and in FIG. 4A where the loss data 402 is combined 404 with the weight map 204 to produce weighted loss data 406.

Based on the weighted loss 406, it is possible to calculate a new state of the restoration network, as shown in step (3) of FIG. 4B and corresponding arrow of FIG. 4A, based on a virtual updating step and obtain the updated parameters of $f_{\theta'}$ as $$\theta' = \theta - \alpha \nabla_\theta (\mathcal{L}_{train}(f_\theta(T_L), T_H) \cdot g_\omega(T_L)) \quad (4)$$

Here α is the learning rate of $f_\theta$. Note that the updated parameter θ' is a function of $g_\omega$, so it is possible to update θ' via $g_\omega$.

Thirdly, $V_L$ is input to the updated restoration network $f_{\theta'}$ and the meta-learner $g_\omega$ is then trained to minimize the loss on the meta-test set $\{V_L, V_H\}$ with respect to ω based on the second-order gradient. This is illustrated in the right most loop of FIG. 4A and arrow (4) which correspond to the step (4) in FIG. 4B.

In order to optimize $g_\omega$, there is proposed a meta-learning scheme where $g_\omega$ is trained based on the gradient from the meta-test data set $\{V_L, V_H\}$. Specifically, with the guidance of $g_\omega$, the restoration network $f_\theta$ as trained with the meta-training data set is driven to perform better on the meta-test data set. That is, the second machine learning model may be trained using the output loss 408 from the test data set $\{VL, VH\}$ as processed by the modified restoration network.

Finally, after $g_\omega$ is updated, a new iteration of the training process may be started, and the restoration network can then be further updated and modified with the optimized weight map.

The training process may also be summarized as in the below example code:

Require:
  $\{T_L, T_H\}$: meta training data, $\{V_L, V_H\}$: meta test data.
  $g_\omega(T_L)$: training set weight generator, $f_\theta(T_L)$: restoration network.
1: initialize $g_\omega$ and $f_\theta$
2: for each iteration do
3: Sample a batch of meta data $\{T_L, T_H\}$ and $\{V_L, V_H\}$.
4: Compute the weight map $g_\omega(T_L)$ for data $T_L$.
5: $\theta'=\theta$. >Inner loop, one iteration may be adequate
6: for a sufficient number of times do
7: Calculate a new $\theta'$ with gradient: $\theta'=\theta'-\alpha\nabla_\theta \mathcal{L}_{train}((f_\theta(T_L), T_H)\cdot g_\omega(T_L))$.
8: Update $g_\omega$ with meta-gradient upon $\theta'$ with respect to $\omega$: >Outer loop.
  $\omega \leftarrow \omega - \beta\nabla_\omega \mathcal{L}_{val}(f_{\theta'}(V_L), V_H)$.
9: Update $f_\theta$ with renewed weight map: $\theta'=\theta'-\alpha\nabla_\theta \mathcal{L}_{train}((f_\theta(T_L), T_H)\cdot g_\omega(T_L))$.

Although the calculation of the second-order gradient requires high computation, it can be calculated efficiently using the finite difference approximation. Specifically, the parameter of $g_\omega$ is updated as $$\omega' = \omega - \beta\nabla_\omega(\mathcal{L}_{val}(f_{\theta'}(V_L), V_H)). \quad (5)$$

Here, $\beta$ is the right most loop of FIG. 4A learning rate and $f_{\theta'}$ is the one-step updated restoration network, as illustrated in step (3) of FIG. 4B. $\mathcal{L}_{val}$ is the loss on the meta-test set $\{V_L, V_H\}$:

$$\mathcal{L}_{val}(f_{\theta'}(V_L), V_H) = \frac{1}{HW}\sum_{H,W}\mathcal{L}(f_{\theta'}(V_L(h,w)), V_H(h,w)). \quad (6)$$

According to the chain rule, the gradient in the second term of Eq. 4 can be rewritten as follows.

$$\nabla_\omega(\mathcal{L}_{val}(f_\theta(V_L), V_H)) = -\alpha\nabla_{\omega,\theta}(\mathcal{L}_{train}(f_\theta(T_L), T_H)\cdot g_\omega(T_L))\nabla_{\theta'}\mathcal{L}_{val}(V_L), V_H). \quad (7)$$

With the finite difference approximation, the right side of Eq. 7 can be rewritten as $$-\alpha\frac{\nabla_\omega(\mathcal{L}_{val}(f_{\theta^+}(V_L), V_H)) - \nabla_\omega(\mathcal{L}_{val}(f_{\theta^-}(V_L), V_H))}{2\epsilon}. \quad (8)$$

Here $$\theta^\pm = \theta \pm \epsilon\nabla_{\theta'}(\mathcal{L}_{train}(f_{\theta'}(T_L), T_H)\cdot g_\omega(T_L)). \quad (9)$$

The small scalar $\epsilon$ is emprically chosen as $$\epsilon = \frac{0.01}{\|\nabla_{\theta'}\mathcal{L}_{val}(f_{\theta'}(V_L), V_H)\|_2}. \quad (10)$$

As a result of the approximation, the gradient in Eq. 4 can be calculated with two forward and two backward passes. The computation complexity may be reduced from $O(\theta\omega)$ to $O(\theta+\omega)$.

The above series of mathematical steps of the training process are described again below in a structure by structure format similar to the structures of FIG. 3.

The first step may be considered as training the first machine learning model $f_\theta$ by using training data comprising degraded image data and corresponding optimum image data where the degraded image data is provided as the input to the first machine learning model. The degraded image data, having been provided to the first machine learning model, is restored based on the restoration processing configured be provided by the first machine learning model in order to create restored image data. The image processing system may then determine loss data by comparing the restored image data to the corresponding optimum image data. The loss data may then be combined with a weight map to form weighted loss data which comprises the spatial distribution of the loss data. A first backwards pass of the training process updates the first machine learning model based on the calculated weighted loss data. This process is shown in FIG. 4A as the left-hand loop comprising structure 302 and backwards pass arrow labelled (1) and in 4B by step (1). The first machine learning model is therefore updated to account for the weighting of the weight map in its restoration processing, but not to incorporate it directly. In a later iteration of this step, the weight map may be an updated weight map with a variety of different levels of convergence. Each time the first machine learning model is implemented with a different weight map, its own implementation of the restoration processing is altered until it too reaches a point of convergence. Convergence in any case may be defined as a state in which the repeating of iterations of training has a negligible effect on the model being trained. The point at which the effect becomes negligible will depend on the implementation choices.

The training of the second machine learning model $g_\omega$ may be achieved by implementing an updating process. The updating process is indicated in FIG. 4A by the central loop labelled (2) and the step (2) of FIG. 4B. This step of the training process comprises receiving the weighted loss data at the second machine learning model. For example, this is the result of the first step (1) described above. The second machine learning model may now consider a spatial distribution of the loss data based on the weighted loss data. From this information, the second machine learning model may identify which spatially distributed regions of a degraded image are more susceptible to degradation based on features of the particular training image used. As a result, the weight map may be updated to account for the spatial distribution of the loss derived from the weighted loss data. In a future iteration of the training of the first machine learning model, this updated weight map may be used to produce the next instance of weighted loss data. Thus, a weight map may be generated for use in performing restoration processing on the degraded image, such that a greater weighting is applied to the identified regions. The second machine learning model has been trained to recognize areas of an image which require processing emphasis during the restoration processing.

As described elsewhere herein, the weight map updating process may be repeated so as to iteratively update the weight map based on weighted loss data generated from a previous weight map and the first machine learning model. In a yet further iteration, the first machine model may be an updated first machine learning model which has been updated to account for a previously updated weight map. It should be appreciated that in at least some iterations of the above described method, the training data may be different from the training data received in the previous iteration of the method. For example, in FIG. 4A, the training data is shown as an image of a tiger, but on following iterations of the training process, where the weight map or the first machine learning model, or both are updated, the training data may comprise a different image (e.g. a lion). The frequency with which the images are changed may be chosen in dependence on the specific image restoration processing being performed. Similarly, the frequency with which the training image is changed may depend on whether it is important to obtain an updated weight map to a point of convergence before further testing the first machine learning model on held-out test data, or whether a slow convergence of the weight map on a large variety of different training images is preferred. This selection may depend on the final implementation of the first machine learning model regarding the specific image restoration processing executed, or the expected degree of variation in the images being processed.

The next step in the method comprises modifying the first machine learning model by combining the first machine learning model with the second machine learning model. This step is shown in FIG. 4A by the arrow labelled (3) and corresponding to step (3) in FIG. 4B. In doing this, there is created a modified first machine learning model which directly incorporates aspects of the second machine learning model as trained so far. This enables the modified first machine learning model to focus on regions of a degraded image that are more susceptible to degradation without directly computing a weight map. That is, the first machine learning model is modified as a result of the output of the second machine learning model to recognize areas of the image which require being focused on or require processing emphasis. Thus, the weight map generated by the second machine learning model becomes a guide for the modified first machine learning model such that it may infer what parts of an image need to be focused on during the image restoration processing in order to obtain an optimal output.

The modified first machine learning model may then be tested on unseen test data. In a similar process to the initial training of the first machine learning model, test data comprising degraded image data is provided as an input to the modified first machine learning model. The modified first machine learning model is then implemented to create reconstructed image data by restoration processing of the degraded image data. Loss data can subsequently be determined by comparing the reconstructed image data to corresponding optimum image data. However, in the training of the modified first machine learning model with test data, the loss data is not combined with weight map data. This is because, as explained above, the weight map is now intrinsically part of the modified first model. The loss data from the test data may instead be used in a second backwards pass to optimize the second machine learning model. This backwards pass step is shown in FIG. 4A labelled (4) and in FIG. 4B in corresponding step (4).

The updated first machine learning model may be further trained by generating weight maps for further training image data using the now optimized second machine learning model. That is, the updated first machine learning model may be trained according to the above described method of step (1) but wherein the weight map is generated by the optimized second machine learning model having previously been trained according to step (4) of the method described above.

Again, a further round of the above described training loops may ensue, where the optimized second machine learning model is updated by implementing the updating process described above in relation to step (2) of FIG. 4B. The optimized second machine learning model is updated to generate a weight map to account for the spatial distribution of the loss derived from the weighted loss data.

Ultimately, the above described training method and its various loops may be combined together to result in modifying the modified first machine learning model in a similarly iterative manner, combining the modified first machine learning model with the updated optimized second machine learning model to create a second modified first machine learning model. The second modified machine learning model trained to focus its image restoration processing on regions of a degraded image that are more susceptible to degradation.

In a specific implementation of the above described training method, the restoration processing may be a joint denoising and demosaicing processing. In this specific case, the received degraded image data may be RAW image data comprising a red, green or blue value for each sampled pixel. Thus, the first machine learning model may be trained to infer a denoised and demosaiced RGB (red, green, blue) image from the received RAW image data.

Figure 5A:
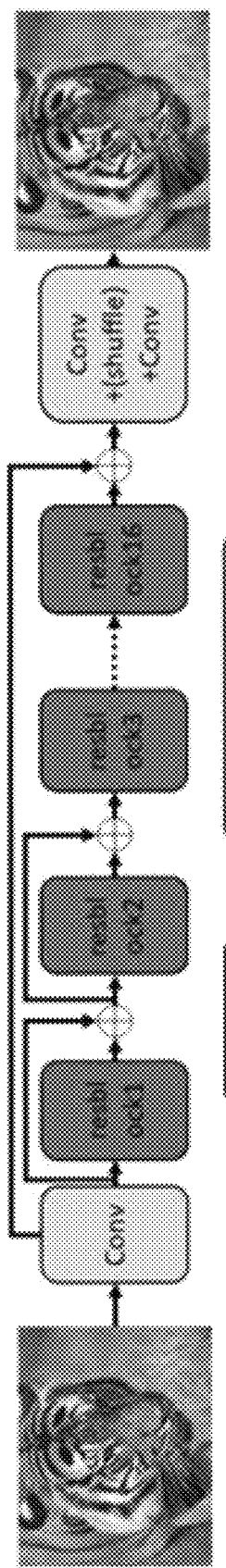
FIG. 5A shows an example network architecture of the first machine learning model $f_\theta$.
Figure 5B:
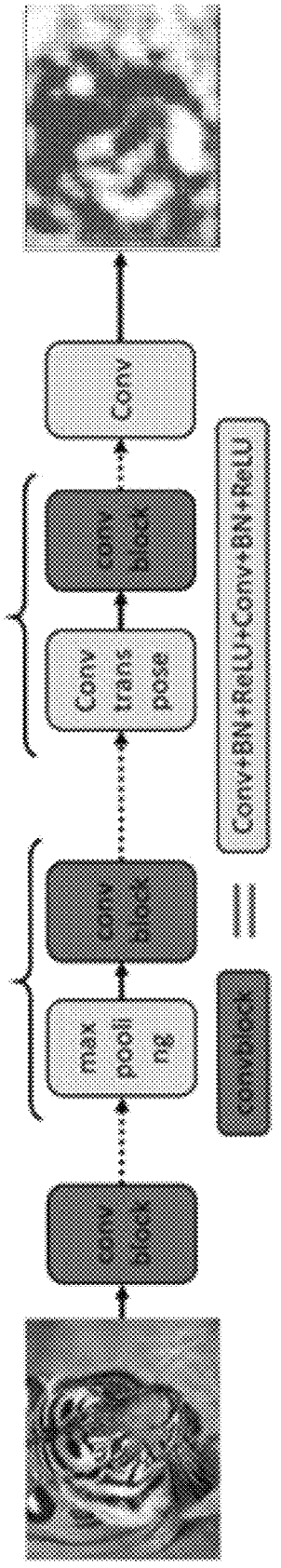
FIG. 5B shows an example network architecture of the second machine learning model $g_\omega$.

FIGS. 5A and 5B show example network architectures of the restoration network or first machine learning model $f_\theta$, and the weight generator or second machine learning model $g_\omega$, respectively.

In one example implementation, the restoration network $f_\theta$ may be a convolutional neural network. In this implementation, the residual network may comprise sixteen residual blocks with a convolution layer and a rectified linear unit (ReLU) activation layer.

The machine learning model $g_\omega$ may also be formulated as a convolutional neural network in an encoder-decoder architecture, with four downsampling layers and four upsampling layers. To ensure that the generated weight map is always non-negative, a ReLU function may be applied on the output of the machine learning model $g_\omega$.

As discussed above, during the training process, the training dataset may be split into two subsets: the meta-training set $\{T_L, T_H\}$ and the meta-test set $\{V_L, V_H\}$. The sets $\{T_L, T_H\}$ and $\{V_L, V_H\}$ may be swapped between iterations and in some implementations they may be swapped between every iteration.

The proposed approach as described above may have multiple advantages over previous approaches. For example, the proposed approach may provide an improved image processing performance without extra computation during inference. This is because compared with conventional methods, the proposed approach only requires extra computation in training.

The proposed approach may also have improved robustness on imbalanced training data. In low-level vision tasks, it is difficult to balance the training data regarding image characteristics since the image characteristics are hard to describe or quantify and they are likely to be local. A model could overfit on the basic patterns in the dataset but overlook the hard or rare patterns. The proposed approach may reweight the training data and thus result in a more robust model.

The proposed approach learns how to infer a weight map in an end-to-end fashion without using a separate or pretraining process in the training. The training is instead performed in a nested loop configuration, with loops placed in parallel portions of the training structure.

The present approach is widely applicable for many low-level vision problems which can be rectified with restoration image processing, including joint denoising and demosaicing, super-resolution, and deblurring.

The proposed image restoration processing method has been applied to multiple low-level vision tasks including image demosaicing, denoising, super-resolution, and deblurring.

Figure 6A:
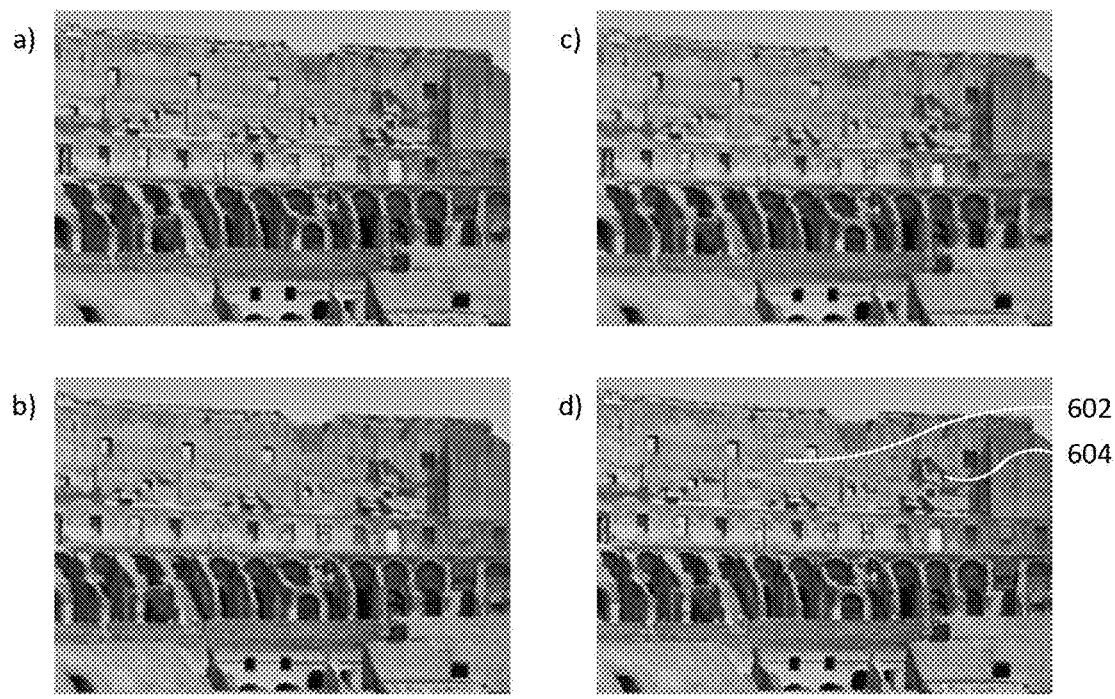
FIGS. 6A and 6B show the results of the proposed approach as applied to the tasks of image demosaicing and joint denoising and demosaicing (JDD) respectively.
Figure 6B:
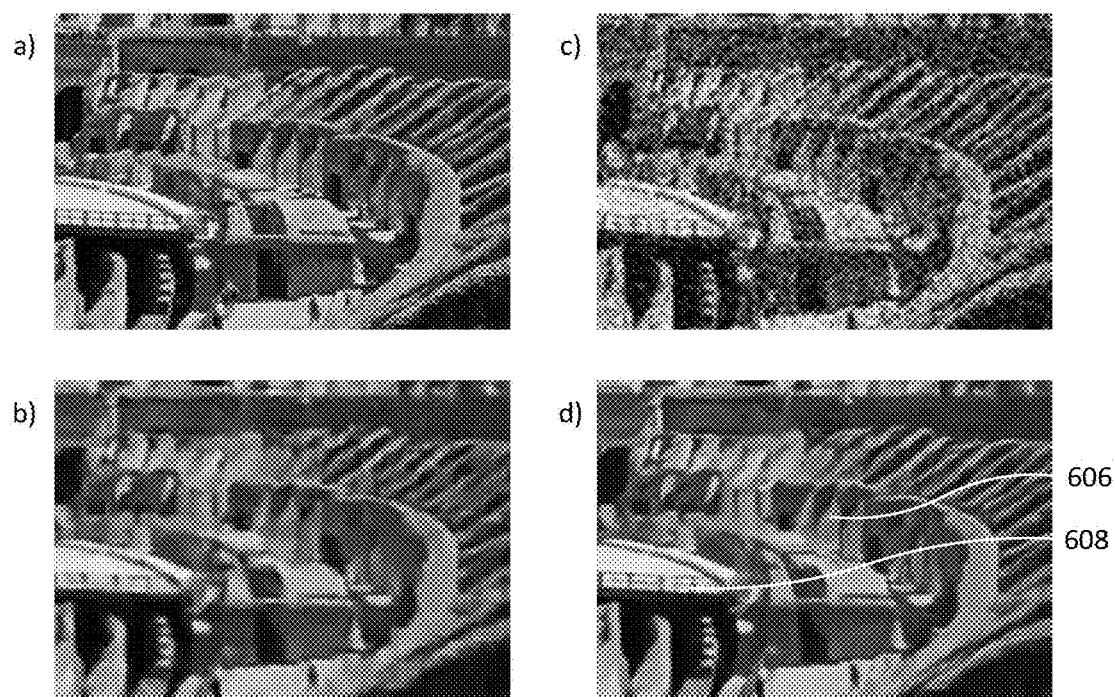

FIGS. 6A and 6B show the results of the proposed approach as applied to the tasks of image demosaicing and joint denoising and demosaicing (JDD) respectively. Compared with the baseline method, the proposed approach leads to noticeable improvement in these examples and provides more details and sharper edges. More importantly, the performance boost does not increase model complexity or require more computation at inference. In addition, the proposed approach can be easily plugged in to other image restoration tasks.

FIG. 6A shows the result of performing an image restoration processing task, which specifically required image demosaicing, using a machine learning model trained as described above and compared to other existing methods. The portion a) of FIG. 6A shows the ground truth image. The portion b) of FIG. 6A shows the result of a simple demosaicing which converts each RGGB (red, green, green, blue) quad in the CFA (color filter array) into an RGB pixel by averaging the G (green) channels. The portion c) of FIG. 6A shows the ResNet demosaicing result. The portion d) of FIG. 6A shows the ResNet demosaicing result with a weight map according to the proposed approach. It can be seen from the portion d) of FIG. 6A that implementing the weight map approach to training the machine learning model reduces distortions and restores more details in the output of the restoration processing. In particular, details in the brickwork are less blurred and lost into the surrounding bricks 602, and shadows and highlights around relief structures are sharper edged and have a greater depth 604.

FIG. 6B shows the result of performing an image restoration processing task, which specifically required joint denoising and demosaicing (JDD), using a machine learning model trained as described above and compared to other existing methods. The portion a) of FIG. 6B shows the ground truth image. The portion b) of FIG. 6B shows the demosaicing result by a simple demosaicing which converts each RGGB quad in the CFA into an RGB pixel by averaging the G channels. The portion c) of FIG. 6B shows the JDD result by ResNet. The portion d) of FIG. 6B shows the JDD result by ResNet with the proposed weight map. The weight map reduces artifacts and produces sharper edges. In particular, details are less noisy or blurred (see e.g., 606), and fine details are sharper and have greater definition (see e.g., 608).

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device comprising an image processor configured to train an image processing system by training:
   a first machine learning model for performing restoration processing on degraded image data; and
   a second machine learning model for recognizing areas of an image requiring processing emphasis during the restoration processing,
   wherein an output of the second machine learning model is an input to the first machine learning model to optimize the restoration processing, and
   wherein training of the first machine learning model comprises:
      determining loss data by comparing reconstructed image data generated from the degraded image data with corresponding optimum image data;
      combining the loss data with a weight map to form weighted loss data comprising a spatial distribution of the loss data; and
      updating the first machine learning model based on the weighted loss data,
   wherein the weight map comprises per-pixel weighting values, such that different pixels are assigned different weights based on image characteristics at respective pixel locations, and
   wherein combining the loss data with the weight map comprises modulating a contribution of the loss data at each pixel according to the respective per-pixel weighting value in the weight map.

2. The device according to claim 1, wherein the training of the first machine learning model further comprises:
   receiving training data comprising the degraded image data and the corresponding optimum image data and providing the degraded image data as an initial input to the image processing system; and
   passing the degraded image data to the first machine learning model configured to generate the reconstructed image data by performing the restoration processing of the degraded image data.

3. The device according to claim 1, wherein the second machine learning model is trained by:
   receiving the weighted loss data at the second machine learning model;
   determining by the second machine learning model the spatial distribution of the loss data based on the weighted loss data; and
   updating the weight map to account for the spatial distribution of the loss data derived from the weighted loss data.

4. The device according to claim 1, wherein the second machine learning model is trained to:
   identify which spatially distributed regions of a degraded image are more susceptible to degradation based on one or more image features; and
   generate a weight map for use in performing restoration processing on the degraded image such that a greater weighting is applied to the identified regions.

5. A method of training an image processing system comprising a first machine learning model, the method comprising training the first machine learning model by:
   receiving training data comprising degraded image data and corresponding optimum image data and providing the degraded image data as an input to the image processing system;

passing the degraded image data to the first machine learning model configured to create restored image data by restoring the degraded image data;

determining loss data by comparing the restored image data to the corresponding optimum image data;

combining the loss data with a weight map to form weighted loss data comprising a spatial distribution of the loss data; and updating the first machine learning model based on the weighted loss data, wherein the weight map comprises per-pixel weighting values, such that different pixels are assigned different weights based on image characteristics at respective pixel locations, and wherein combining the loss data with the weight map comprises modulating a contribution of the loss data at each pixel according to the respective per-pixel weighting value in the weight map.

6. The method according to claim 5, wherein the image processing system further comprises a second machine learning model and the method further comprises training the second machine learning model by performing an updating process comprising:

receiving the weighted loss data at the second machine learning model;

determining by the second machine learning model the spatial distribution of the loss data based on the weighted loss data; and updating the weight map to account for the spatial distribution of the loss data derived from the weighted loss data.

7. The method according to claim 6, wherein the training of the image processing system is repeated so as to iteratively update the weight map based on weighted loss data generated from a previous weight map and the first machine learning model in a previous iteration of training the image processing system.

8. The method according to claim 7, wherein, in at least some iterations of the training of the image processing system, the training data is different from the training data received in a previous iteration of the training of the image processing system.

9. The method according to claim 6, wherein the method further comprises modifying the first machine learning model by combining the first machine learning model with the second machine learning model to create a modified first machine learning model such that the modified first machine learning model is trained to focus on regions of a degraded image that are more susceptible to degradation.

10. The method according to claim 9, further comprising:

receiving test data comprising degraded image data and corresponding optimum image data and providing the degraded image data as an input to the modified first machine learning model;

creating reconstructed image data by restoration processing of the degraded image data;

determining loss data by comparing the reconstructed image data to the corresponding optimum image data; and optimizing the second machine learning model based on the loss data to generate an optimized second machine learning model.

11. The method according to claim 10, wherein the weight map is generated by the optimized second machine learning model.

12. The method of claim 11, further comprising updating the optimized second machine learning model by implementing an updating process comprising:

receiving weighted loss data at the optimized second machine learning model;

determining, by the optimized second machine learning model, the spatial distribution of the loss data based on the weighted loss data; and updating the optimized second machine learning model to generate a weight map to account for the spatial distribution of the loss data derived from the weighted loss data.

13. The method according to claim 12, further comprising modifying the modified first machine learning model by combining the updated first machine learning model with the updated optimized second machine learning model to create a second modified first machine learning model such that the second modified first machine learning model is trained to focus on regions of a degraded image that are more susceptible to degradation.

14. The method according to claim 10, wherein the restoration processing is a joint denoising and demosaicing processing and the received degraded image data is RAW image data comprising a red, green or blue value for each sampled pixel, such that the first machine learning model is trained to infer a denoised and demosaiced RGB image from the received degraded image data.

15. A device comprising an image processor, the image processor being configured to train an image processing system comprising a first machine learning model, and the training of the image processing system comprising training the first machine learning model by:

receiving training data comprising degraded image data and corresponding optimum image data and providing the degraded image data as an input to the system;

passing the degraded image data to the first machine learning model configured to create restored image data by restoring the degraded image data;

determining loss data by comparing the restored image data to the corresponding optimum image data;

combining the loss data with a weight map to form weighted loss data comprising a spatial distribution of the loss data; and updating the first machine learning model based on the weighted loss data, wherein the weight map comprises per-pixel weighting values, such that different pixels are assigned different weights based on image characteristics at respective pixel locations, and wherein combining the loss data with the weight map comprises modulating a contribution of the loss data at each pixel according to respective per-pixel weighting value in the weight map.

16. The device according to claim 15, wherein the image processing system further comprises a second machine learning model and the training of the image processing system comprises training the second machine learning model by implementing an updating process comprising:

receiving the weighted loss data at the second machine learning model;

determining by the second machine learning model the spatial distribution of the loss data based on the weighted loss data; and updating the weight map to account for the spatial distribution of the loss derived from the weighted loss data.

17. The device according to claim 16, wherein the training of the image processing system is repeated so as to iteratively update the weight map based on weighted loss data generated from a previous weight map and the first machine learning model in a previous iteration of training the image processing system.

18. The device according to claim 17, wherein, in at least some iterations of the training of the image processing system, the training data is different from the training data received in a previous iteration of the training of the image processing system.

19. The device according to claim 16, wherein the training of the image processing system further comprises modifying the first machine learning model by combining the first machine learning model with the second machine learning model to create a modified first machine learning model such that the modified first machine learning model is trained to focus on regions of a degraded image that are more susceptible to degradation.

20. The device according to claim 19, wherein the training of the image processing system further comprises:
- receiving test data comprising degraded image data and corresponding optimum image data and providing the degraded image data as an input to the modified first machine learning model;
- creating reconstructed image data by restoration processing of the degraded image data;
- determining loss data by comparing the reconstructed image data to the corresponding optimum image data; and
- optimizing the second machine learning model based on the loss data.

* * * * *